United States Patent [19]
Sulzyc

[11] Patent Number: 5,730,428
[45] Date of Patent: Mar. 24, 1998

[54] LEVELING VALVE HAVING A PRECISION ADJUSTMENT DEVICE

[75] Inventor: Georg Sulzyc, Eppelheim, Germany

[73] Assignee: Grau GmbH, Heidelberg, Germany

[21] Appl. No.: 598,493

[22] Filed: Feb. 8, 1996

[30] Foreign Application Priority Data

Feb. 9, 1995 [DE] Germany .................. 195 04 296.4

[51] Int. Cl.$^6$ .................................................. B60G 17/00
[52] U.S. Cl. .................................... 267/64.16; 280/714
[58] Field of Search .......................... 267/64.11, 64.16, 267/64.28, DIG. 1; 188/300; 280/DIG. 1, 714; 137/102, 627.5, 628

[56] References Cited

U.S. PATENT DOCUMENTS 5,176,404   1/1993   Sulzyc .................................. 280/714 X

FOREIGN PATENT DOCUMENTS

| | | |
|---|---|---|
| 1966636 | 6/1973 | Germany . |
| 2920465 | 12/1980 | Germany .................. 267/64.16 |
| 2920507 | 12/1980 | Germany .................. 267/64.16 |
| 4305500A1 | 8/1994 | Germany . |

*Primary Examiner*—Mark T. Le
*Assistant Examiner*—Pamela J. Lipka
*Attorney, Agent, or Firm*—Thomas, Kayden, Horstemeyer & Risley

[57] ABSTRACT

A leveling valve, having a precision adjustment device, for use with the suspension system of a motor vehicle. The leveling valve includes a valve housing and an inlet-outlet valve positioned within the valve housing for directing pressurized fluid from a fluid reservoir through the valve housing to a fluid suspension bellows, the inlet-outlet valve being moveable from an open position into a closed position. An elongated control rod is positioned within the valve housing and sealed therein, one of the ends of the control rod being connected to the inlet-outlet valve, and the other of the ends of the control rod having a cam follower formed as a part thereof. The precision adjustment device includes a housing branch formed as a part of the valve housing, in which an elongated shaft formed about an axis and extending radially away from the control rod to outside of the housing branch is fitted. One of the ends of the elongated shaft is received within the cam follower of the control rod, and the other of the ends of the shaft extends outside of the housing branch. At least one arcuate surface is formed on the exterior of the valve housing branch on which at least one forked adjustment lever is received for holding the elongated shaft in fixed position as a separately provided control lever is attached thereto. The adjustment lever has a cooperating surface which is constructed and arranged in an arcuate configuration to be received on the arcuate surface formed on the exterior of the housing branch, and is fastened to the housing branch by a threaded fastener passed through an elongated slot formed in the adjustment lever.

12 Claims, 3 Drawing Sheets

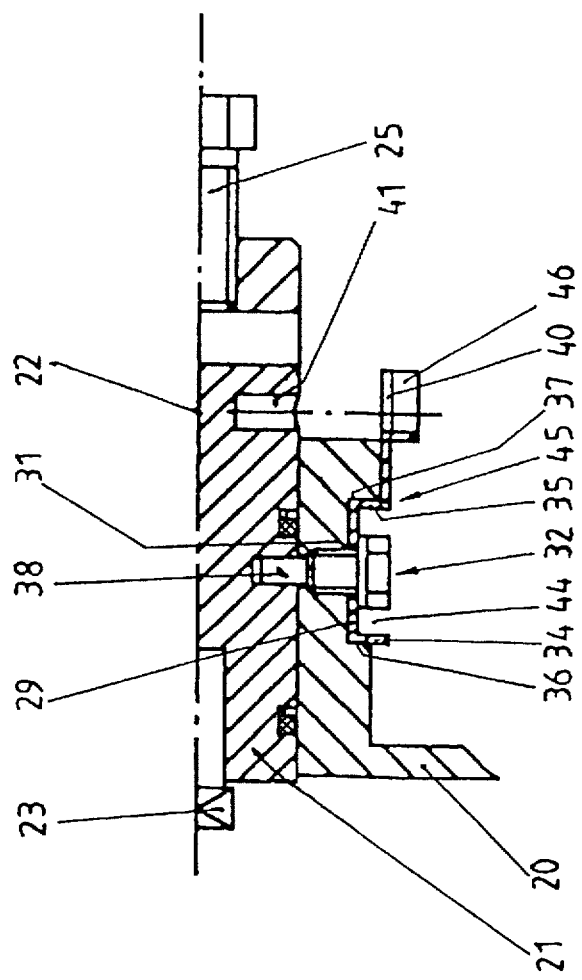

LEVELING VALVE HAVING A PRECISION ADJUSTMENT DEVICE

FIELD OF THE INVENTION

This invention relates to a leveling valve having a precision adjustment device for use in heavy transport vehicles. The leveling valve includes a housing with a movable control rod sealingly guided therein that actuates an inlet-outlet valve, whereby a control element having a lever, a shaft, and an eccentric follower is movable around an axis for controlling the control rod based on the cargo load, and at least one forked lever adjustable to a common closing position on the inlet-outlet valve to fix the control element lever in a generally horizontal position, which can be fixed with a screw or a nut with respect to a housing branch surrounding the shaft so that the closing position of the inlet-outlet valve corresponds to a horizontal position of the control element lever independently of the cargo load of the vehicle.

BACKGROUND OF THE INVENTION

Typical leveling valves have two positions which can be pegged out, depending on if the control element lever extends to the right or to the left of the housing of the leveling valve, if the leveling valve is arranged on the right or left side of the vehicle, respectively. Thereby, a pin is put through an open edge slot of a forked lever, whereby the forked lever is once again adjustable. By adjusting the forked lever, the allocation to the closing position of the inlet-outlet valve is fixed and so far producing tolerances can be balanced.

A leveling valve of the described type is known from DE 43 05 500 A1. There, the housing branch which surrounds the shaft of the control element forms on the one side a fixed forked lever which cannot be adjusted. An inner control device between the control rod which actuates the inlet-outlet valve and a guiding part that grips the eccentric follower of the control element is provided for actuating the valve. On the other side of the leveling valve housing branch which surrounds the shaft, an adjustable forked lever is provided. This forked lever is adjustable around a pivot that extends radially toward the axis of the shaft, and thus towards the axis of the housing branch in a surface parallel to the axis of the shaft. The forked lever grips around the pin with its open edge slot to not only enable a middle position in which the connecting line of the forked lever between pivot and opening is parallel to the axis of the shaft, but also inclining positions, spaced between the open edge opening and the pin is needed. This allows for adjustment of the forked lever into different angle positions. While adjusting, such an angle position is chosen in which the lever of the leveling valve is in a horizontal position and the closing position of the inlet-outlet valve is obtained. Because of this necessary space between the open edge opening and the pin, the pegging out cannot be as exact. Since depending on the different angle positions between the forked lever and the pin a different space occurs, also different or inexact pegging out positions occur.

A leveling valve is also known that has no inner control device and that has two adjustable forked levers for turning to the left or right on the housing branch that guides the shaft of the control element. These forked levers can be also moved around a pivot in a vertical plane which extends parallel to the axis of the shaft. Thus, it is possible to independently adjust one forked lever for moving the lever around to the right and the other forked lever for moving the lever around to the left. Because of the space needed between the open edge opening of each forked lever and the pin, also here the already described disadvantages occur.

SUMMARY OF THE INVENTION

An object of this invention is to provide a leveling valve with a constant exact pegging out in different angle positions.

This object of the invention can be achieved with a leveling valve of the described type having a housing branch with a cylindrical surface formed about the axis of the shaft, with a forked adjustment lever having a cylindrical cooperating surface with respect to the cylindrical surface, and with a forked adjustment lever fixable with its cooperating surface to the cylindrical surface of the housing branch by the screw or nut in different angle positions around the axis of the shaft.

The invention is based on the thought of not adjusting the forked levers in an almost vertical plane around a pivot, but rather on a cylindrical surface around the axis of the shaft. This causes the advantage that the relative position between the forked adjustment lever and the pin stays constant despite different angle positions. This again means that almost no space has to exist between the open edge opening and the pin, the dimension therebetween being so that it is only possible to pull out or to insert the pin from outside of the opening. Even a sliding fit can be chosen. The pegging out is thus constant without requiring that instead of the open edge opening a closed edge opening on the forked lever can also be provided. A closed edge opening, however, should take into account the axial space of the shaft in the housing branch. If a leveling valve adapted for use at the right or left is built, it can be installed with two forked levers which both can be adjusted separately. This leads to the advantage that no inner control element is needed, so that the possibility is offered to form the control rod and the guiding part that works with the eccentric follower in one part.

As the cylindrical surface, the already existing cylindrical surface of the housing branch that surrounds the shaft of the control element can serve for a very simple embodiment. It is also possible to provide this housing branch on a projection extending radially away from the axis and to arrange on this projection the cylindrical surface. Reversed, it is also possible to arrange the cylindrical surface in a recess going to the inside extending radially toward the surface of the housing branch.

Due to the cylindrical bend or profile of the forked lever, with its cylindrical cooperating surface, and the cylindrical surface on the housing branch, a guiding of the forked lever along the circumference of the housing branch occurs. Otherwise, the forked lever has a slot for the coming through of a screw or of a barrel of a screw that works with a nut to fix the adjusted angle position.

This slot causes a certain guidance of the forked lever along the circumferential direction. It is also possible, however, that the forked lever has additional guiding planes which extend radially along the circumference about the axis. Thus the forked lever will have edges that work with corresponding cooperating surfaces on the projection or the recess so that the forked lever is guided on this cylindrical surface about the axis of the shaft. In each case, however, the forked lever has a slot parallel to the guiding planes.

It is advantageously possible that there is a screw that has an extension extending radially toward the axis for holding the forked lever in different angle positions. In connection with this, the shaft, which is rotatable about the axis, has a circumferential groove, whereby the screw with its extension grips this groove, and thus the shaft is fixed in the axial direction within the housing branch. Thus the screw fulfills a double function.

The forked lever can be formed in opposite hand. Since the forked lever is usually produced as a pressed part, this forming can be done easily, and the forked lever becomes more stable despite using a thin material.

The forked lever can provide in its part opposite the screw or nut an opening with a collar. This opening can be formed as an open edge or a closed edge. The collar has a longer contact surface with the pin, and thus a better guidance on the shaft.

BRIEF DESCRIPTION OF THE DRAWINGS

The invention is further explained and described in preferred examples of realization, in which it is shown in:

FIG. 4 a partial cross-section view of a second embodiment of the adjustable forked lever.

DETAILED DESCRIPTION

Figure 1:
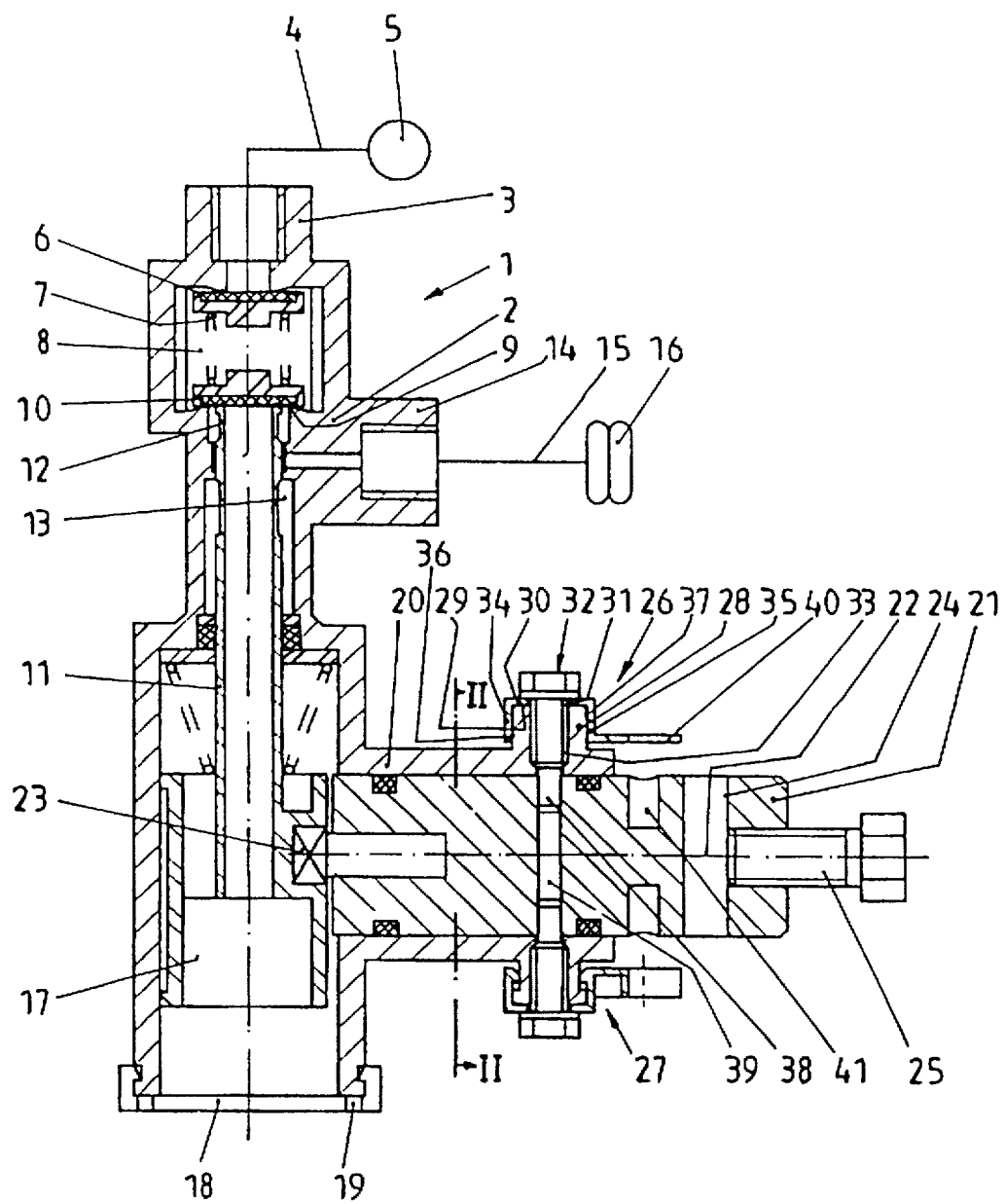
FIG. 1 a cross-sectioned side elevational view of a preferred embodiment of the leveling valve and a precision adjustment device.

The leveling valve 1 illustrated in FIG. 1 illustrates the parts of interest for the present invention in cross-section. A housing 2 is provided which has a connection 3, on which an air line 4 ends in an air reservoir 5. A single valve body 6 forms a check valve having a spring 7, the check valve being provided at the entrance of a storage chamber 8. An intake seat 9 of the housing 2 together with a double valve body 10 forms an inlet valve 9, 10. In housing 2 a movable control rod 11 is sealingly positioned. The control rod is formed to be hollow for venting reasons and forms an outlet valve 10, 12 with its upper discharge seat 12 in connection with the double valve body 10. Between intake seat 9 and discharge seat 12 a flow chamber 13 is provided in the housing, on which a pipeline 15 is installed by a connection 14 which leads to one or more suspension bellows 16.

In the lower part of housing 2 of leveling valve 1, a vent opening 17 covered by a flap valve 18 is provided. The flap valve 18 is usually made of a rubber or elastic material, and has one or more airways 19 through which air can escape out of suspension bellows 16 into the atmosphere if the outlet valve 10, 12 is opened. Housing 2 has a housing branch 20 along its side that is basically formed as a pipe pocket in which a shaft 21 is positioned, its inner part being movable around axis 22 within housing branch 20. Shaft 21 carries control rod 11 thereon through an eccentric follower 23 by which the turning movement of shaft 21 is translated into linear movement of a control rod 11. Shaft 21 has a transverse bore 24 for receiving a lever (not illustrated) at the end of shaft 21 that projects out of the housing branch 20, which is an important part of a mechanical control element. The lever that can be passed into transverse bore 24, from either side, can be fixed with a fixing screw 25.

Figure 2:
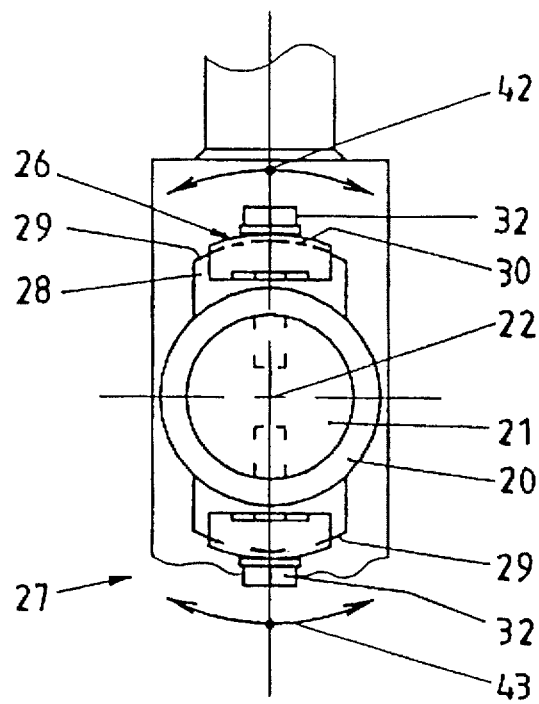
FIG. 2 a cross-section view along line II—II of FIG. 1.

A forked adjustment lever 26 for movements to the left, for example, and another forked adjustment lever 27 for movements to the right, for example, are provided on housing branch 20. The forked adjustment levers 26 and 27 and the important parts and embodiments for their adjustment are provided in a double arrangement that mirror one another and thus only the embodiment and arrangement of forked lever 26 is described. The forked lever 26 works together with a projection 28 of the housing branch 20 which extends radially away from axis 22 toward the outside and extends over a certain circumference (FIGS. 2 and 3) of the housing branch. The projection 28 has a cylindrical surface 29, thus forming a part of a cylinder around the axis 22. The forked lever 26 is provided with a cylindrical cooperating surface 30 the circumference of which is formed a little smaller than the cylindrical surface 29. The forked lever 26 has a slot 31 through which a screw 32 passes that is screwed into a thread 33 of the projection 28. By tightening the screw 32, the forked lever 26 can be adjusted or fixed according to the construction of slot 31 in different angles on a cylindrical plane around the axis 22. Actually, the embodiment of the cylindrical surface 29 and the cylindrical form of the cooperating surface 30 in connection with the slot is enough to adjust the forked lever 26 in different angles around the axis 22. The forked lever 26 can additionally be provided with edges 34 and 35 that extend from forked lever 26 radially toward axis 22 in the direction of the circumference of projection 28 so that projection 28 and other guiding surfaces 36 and 37 are formed. The screw 32 can show an extension 38 which fits within a surrounding groove 39 of the shaft 21 so that with an adjusted forked lever 26 and with a fixed screw 32 the projection also stops shaft 21 in the axial direction.

On the front end of the forked lever 26 which extends toward the outside, an open edge opening 40 is formed which is formed like a u-shape or a fork. This opening 40 could also be formed as a closed edge bore or as a slot which extends parallel to the axis 22. The opening 40 is formed in alignment with a bore 41 in the shaft 21, and serves to insert a pin (not illustrated) through the opening 40 into the bore 41 so that the movability of shaft 21 is thus blocked. By adjusting the forked lever 26 along the cylindrical surface about axis 22, the positioning and the according angles of forked lever 26 with respect to the closed position of the inlet-outlet valve 9, 10, 12 is obtained for the respective positioning of the lever (not illustrated) in the transverse bore 24. The same is true for forked lever 27 and for the lever (not illustrated) put into the transverse bore 24 from the other side of shaft 21.

By adjusting forked lever 26 on the one hand and the forked lever 27 on the other hand with respect to the cylindrical surface around axis 22, openings 40 and the corresponding pins (not illustrated) are always positioned with respect to each other despite the different angle positions. This allows for introducing a very small clearance between the opening 40 and the corresponding pin necessary only for inserting or removing the pin. This clearance can be completely avoided and the arrangement can be formed as a gliding fit with respect to one another so that the lever (not illustrated) of the mechanical control element is exactly fixed and does not shake.

FIG. 2 shows once again the position of the two forked levers 26 and 27. The forked lever 26 is adjustable in the direction of double headed arrow 42, and the forked lever 27 in the direction of double headed arrow 43 along the cylindrical surfaces 29 around axis 22.

Figure 3:
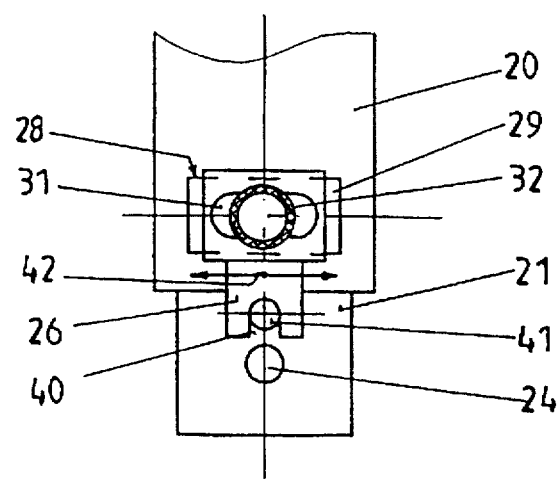
FIG. 3 a partial top plan view of the housing branch and a forked lever for the leveling valve of FIG. 1.

FIG. 3 shows a top plan view of the forked lever 26 as arranged on the housing branch 20.

FIG. 4 shows a second embodiment of the adjustment device. The cylindrical surface 29 of the housing branch 20 here is not provided on a radial projection which extends toward the outside, but is rather provided inside a recess 44.

The forked lever 45 is designed in an opposite angle here, but also shows a corresponding arrangement of an edge 34 and 35, a slot 31, guiding surfaces 36 and 37, and an opening 40.

It is also possible to provide a projection 28 or a recess 44, but to chose as the cylindrical surface 29 the cylindrical outer surface of the housing branch 20 so that the forked lever is thus a very simple form whose most important characteristics is the cylindrical arching of the forked lever. If the pin in the opening 40 has to be positioned on a radial longer part, the opening 40 can be provided with an arcuate collar 46.

LIST OF REFERENCE NUMERALS

| | |
|---|---|
| 1 - leveling valve | 24 - transverse bore |
| 2 - housing | 25 - fixing screw |
| 3 - connection | 26 - forked lever |
| 4 - air line | 27 - forked lever |
| 5 - air reservoir | 28 - projection |
| 6 - single valve body | 29 - cylindrical surface |
| 7 - spring | 30 - cooperating surface |
| 8 - storage chamber | 31 - slot |
| 9 - intake seat | 32 - screw |
| 10 - double valve body | 33 - thread |
| 11 - control rod | 34 - edge |
| 12 - discharge seat | 35 - edge |
| 13 - flow chamber | 36 - guiding surface |
| 14 - connection | 37 - guiding surface |
| 15 - pipeline | 38 - extension |
| 16 - suspension bellow | 39 - groove |
| 17 - vent opening | 40 - opening |
| 18 - flap valve | 41 - bore |
| 19 - airway | 42 - double headed arrow |
| 20 - housing branch | 43 - double headed arrow |
| 21 - shaft | 44 - recess |
| 22 - axis | 45 - forked lever |
| 23 - eccentric follower | 46 - collar |

I claim:

1. A leveling valve for use with the suspension system of a motor vehicle, the suspension system including a pressurized fluid reservoir, at least one fluid filled suspension bellows for leveling the motor vehicle, and a control lever for operating the leveling valve in response to the load carried by the motor vehicle, the leveling valve being in sealed fluid communication with, and intermediate, the fluid reservoir and the suspension bellows, said leveling valve comprising:
    a valve housing;
    an inlet-outlet valve positioned within said valve housing for directing the pressurized fluid from the fluid reservoir therethrough to the suspension bellows, said inlet-outlet valve having an open and a closed position;
    an elongated control rod positioned and sealed within said valve housing, one of the ends of said control rod being connected to said inlet-outlet valve, the other of the ends of said control rod having a cam follower formed as a part thereof;
    a precision adjustment device comprising:
    a) a housing branch formed as a part of said valve housing;
    b) an elongated shaft formed about an axis and fitted within said housing branch adjacent said control rod and extending radially away therefrom, said shaft being constructed and arranged to be rotated within said housing branch about said axis, one of the ends of said shaft having an eccentric cam received within the cam follower of said control rod, and the other of the ends of said shaft extending outside of said housing branch and having a means thereon for receiving the suspension system control lever;
    c) at least one arcuate surface formed on the exterior of said housing branch, said arcuate surface being spaced from the axis of said shaft;
    d) at least one forked adjustment lever extending in a generally parallel direction along the axis of said shaft, said lever having a cooperating surface constructed and arranged to be received on said at least one arcuate surface of said housing branch for guiding said at least one lever thereon; and
    e) means for fastening said at least one lever to said housing branch; whereby the shaft is rotated about its axis within the housing branch so that the eccentric cam at the end of the shaft received within the cam follower moves the control rod, and thus the inlet-outlet valve, into its closed position, said at least one adjustment lever being fastened on the housing branch with respect to the shaft for holding the shaft in position with respect to the control rod as the suspension system control lever is received on the end of the shaft extending out of the housing.

2. The leveling valve of claim 1, wherein said at least one arcuate surface extends along at least a portion of the circumference of a concentric circle formed about said axis.

3. The leveling valve of claim 2, wherein said cooperating surface of said at least one adjustment lever includes a generally slotted opening defined therein and extending along a portion of the circumference of a concentric circle formed about said axis, said slotted opening being sized and shaped to receive said means for fastening therethrough.

4. The leveling valve of claim 1, further comprising at least one projection formed as a part of said housing branch and extending radially away from the axis of said shaft fitted within the housing branch, wherein said at least one arcuate surface on said housing branch is defined on a radially outward facing surface formed on said at least one projection.

5. The leveling valve of claim 4, said at least one projection further comprising a spaced pair of guiding surfaces extending from said radially outward facing surface in a generally radial direction toward the axis of the shaft fitted within said valve housing branch.

6. The leveling valve of claim 5, wherein said corresponding surface of said at least one adjustment lever is received on said radially outward facing surface of said projection, said at least one adjustment lever also extending along at least a portion of each of said guiding surfaces toward said shaft for guiding said at least one adjustment lever on said at least one projection.

7. The leveling valve of claim 4, said housing branch of said leveling valve further comprising two of said arcuate surfaces, each said arcuate surface being formed on a separate and opposed projection formed as a part of said housing branch, each said projection extending radially away from said shaft, and two of said adjustment levers, one of said adjustment levers being received on each said arcuate surface.

8. The leveling valve of claim 1, wherein said at least one arcuate surface is formed within a recess formed on the exterior of said valve housing branch, said recess extending radially toward the axis of said shaft received within the valve housing branch.

9. The leveling valve of claim 1, wherein said shaft fitted within the housing branch includes a continuous groove defined therein and extending along the circumference of the shaft, and wherein said means for fastening comprises at least one threaded screw extending through said at least one adjustment lever radially into said groove.

10. The leveling valve of claim 1, wherein said precision adjustment device further comprises at least one bore defined within said shaft and extending radially toward the axis thereof in the end of said shaft extending out of said housing branch, said at least one adjustment lever including a generally forked opening defined therein in substantial registry with said at least one bore.

11. The leveling valve of claim 10, wherein said at least one adjustment lever includes a generally planar portion extending away from the corresponding surface of said at least one adjustment lever in which said forked opening is defined, said forked opening further comprising a collar extending in a generally perpendicular direction away from said planar portion for receiving a pin passed therethrough and into said bore.

12. A leveling valve for use in leveling the pneumatic suspension system of a load carrying motor vehicle in response to changing loads, the motor vehicle having a framework, a suspension system mounted on the framework including at least one air suspension bellows for cushioning the motor vehicle, an air compressor for charging the air reservoir, and a control lever for operating the leveling valve in response to the load carried by the motor vehicle, the leveling valve being in sealed fluid communication with, and intermediate, the air reservoir and the suspension bellows for regulating the amount of compressed air passed to the suspension bellows, said leveling valve comprising:

a valve housing;

an air storage chamber defined within said valve housing, and an inlet-outlet valve positioned within said valve housing in communication with said air chamber for directing compressed air from the air reservoir through said valve housing to the suspension bellows, said inlet-outlet valve being moveable into an open and a closed position;

a control rod supported and sealed within said valve housing, one of the ends of said control rod being operably connected to said inlet-outlet valve, the other of the ends of said control rod having a cam follower means formed as a part thereof;

a precision adjustment device comprising:
   a) a housing branch formed as a part of said valve housing;
   b) a shaft formed about and extending along an axis, said shaft being received within said housing branch and extending radially away from said control rod, said shaft being constructed and arranged for rotational movement about said axis, one of the ends of said shaft being adjacent said control rod and having a cam formed as a part thereof received within said cam follower means of said control rod, and the other of the ends of said shaft extending outside of and away from said housing branch and having means thereon for receiving the suspension system control lever;
   c) at least one elongated arcuate surface formed on the exterior of said housing branch along at least a portion of the circumference of a concentric circle formed about said axis, said at least one arcuate surface being spaced from the axis of said shaft;
   d) at least one adjustment lever extending in a generally parallel direction with respect to the axis of said shaft, said at least one adjustment lever having an arcuate portion constructed and arranged to be received on said at least one arcuate surface of said valve housing branch for guiding said at least one lever thereon; and
   e) means for fastening said at least one lever to said housing branch;

whereby the shaft is rotated about its axis within the housing branch so that the cam at the end of the shaft received within the cam follower moves the control rod, and thus the inlet-outlet valve, into its closed position, said at least one adjustment lever being fastened on the housing branch with respect to the shaft for holding the shaft in position with respect to the control rod as the suspension system control lever is received on the end of the shaft extending out of the housing.

* * * * *